Jan. 25, 1944.  T. D. DAVIES  2,339,771
COUPLING MEANS
Filed March 9, 1942
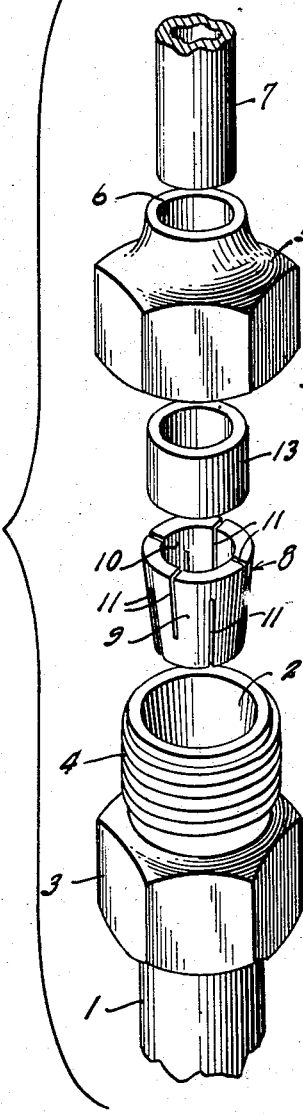
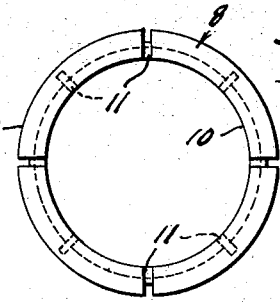
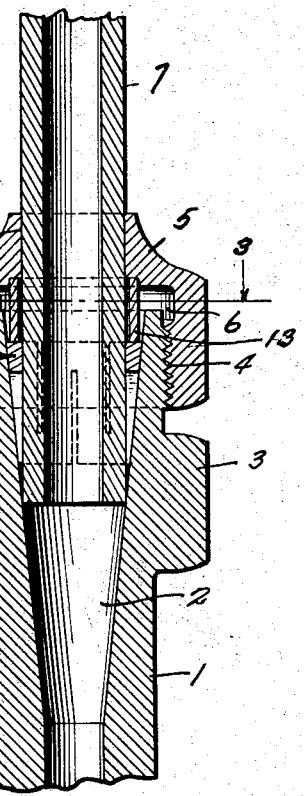
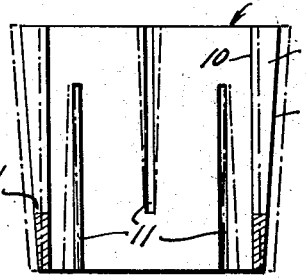
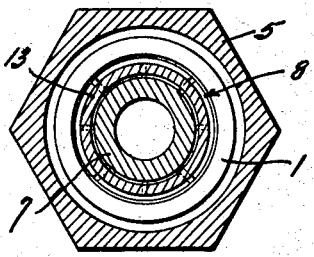
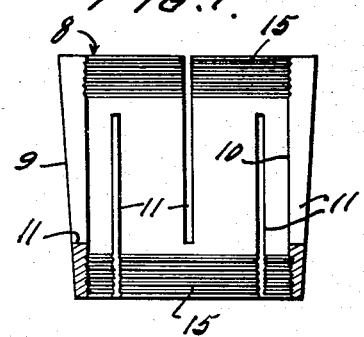
Inventor
THOMAS D. DAVIES
By Semmes, Keegin, Beale & Semmes
Attorney Patented Jan. 25, 1944

2,339,771

UNITED STATES PATENT OFFICE 2,339,771

COUPLING MEANS

Thomas D. Davies, Cleveland, Ohio

Application March 9, 1942, Serial No. 434,003

3 Claims. (Cl. 285—166)

The present invention relates to coupling devices and in particular it relates to coupling devices to be used in connection with conduits through which is passed a fluid medium and which will effect a leak-proof union. While my invention is especially efficacious in connection with coupling conduits or the like through which a fluid is passed, it is thought readily apparent that it may be used with excellent results in providing a water-proof joint for electrical conduits, etc.

At the present time in the majority of hydraulic pipe systems, the fitting which accomplishes the best results is the so-called "flare-type" fitting. While this particular fitting on the whole is quite satisfactory, it does have two definite disadvantageous features. Firstly, it requires a very skilled operator to provide a satisfactory flare on the tubing and consequently due to the human element involved, the majority of these fittings develop leaks under actual operating conditions. Secondly, this type of fitting is limited entirely to the thinner walled and softer tubing which means that high pressure steel tubing must be processed in other ways such as by welding.

The present invention on the other hand overcomes these objectionable characteristics due to the fact that it is not necessary to preflare the tubing and the fitting accomplishes better results when used with the harder and thicker walled tubing. In addition, the pressure that it will hold is practically unlimited.

One of the objects of the present invention is to provide a coupling to be used in hydraulic pipe systems that will effect a leak-proof seal or union and which will eliminate the necessity of employing gaskets or similar packing materials.

And another object of the present invention is to provide a so-called "hydraulic coupling" which comprises few essential working parts and which is positive in operation and which can be easily and inexpensively installed.

Still a further object of the present invention is to provide a coupling of the character herein described which will prevent the conduit from blowing out even though the retaining nut has been removed.

Broadly the present invention comprises an expanded sealing element formed with axial slots or kerfs that permit the element to be compressed and having its exterior and interior surfaces so conformed that the element will fit snugly around the pipe or tube to be coupled and within a tapered aperture formed in the fitting. An annular ring is then disposed within the fitting in engagement with the sealing element and by the proper manipulation of a retaining nut the sealing element effects a leak-proof seal between the fitting and the tube or pipe.

The present invention differs from the majority of couplings of this nature by virtue of the fact that the seal is effected between the fitting and the conduit instead of between the conduit and the retaining nut. With this latter type of coupling, it will be appreciated that some supplemental sealing means must be provided between the fitting and the point of attachment of the nut to the fitting to assure a proper seal.

Referring to the drawing in which like numbers indicate the same or similar parts;

Figure 1 is a view in perspective illustrating the elements that constitute my invention.

Figure 2 is a fragmental transverse sectional view showing my coupling in assembled form.

Figure 3 is a sectional view taken along the line 3—3 of Figure 2 looking in the direction of the arrows.

Figure 4 is a top plan view of my sealing member in its retracted form.

Figure 5 is a view in transverse section of the member shown in Figure 4.

Figure 6 is similar to Figure 4 showing the member when it is in its expanded form.

Figure 7 is a view in transverse section showing a modified type of sealing member that may be employed.

Referring to Figure 1, I have shown a fitting 1 having a tapered bore 2, a hexagonal flange 3 and an exteriorly threaded upper end 4. A retaining nut 5 is adapted to be threaded onto the upper end of the fitting and is provided with a stepped bore 6.

To couple a tube or conduit 7 to the fitting 1 and effect therebetween a leak-proof union, I employ a sealing member designated generally 8 that is adapted to surround the tube and fit precisely within the tapered bore 2. More specifically the member 8 has a conical exterior surface 9 and a cylindrical inner surface 10. A plurality of axial slots or kerfs 11 extend alternately from opposite ends of the member 8 and the slots will permit a certain amount of radial expansion of the member 8. While the drawing illustrates the use of eight such slots, it is obvious that a more or less number may be used. Furthermore, in lieu of axial slots, the slot may wind helically around the sealing element 8. The salient factor is that the slots must extend from opposite ends of the sealing member to permit the member to expand and contract and yet contact the tube 7 and the tapered bore 2 in a continuous area.

An annular ring 13 is disposed upon the upper face of the sealing member 8 and when the conduit or tubing 7 is fitted through the retaining nut 5 and the nut 5 is drawn up, the ring 13 will force the outer conical surface 9 into tight engagement with the tapered bore 2 to effect a positive seal between the tube and the fitting 1.

To assure that the sealing member 8 will conform closely to the configuration of the tube 7, the inner face 10 of the member 8 is first made equal to the final compressed outside diameter of the tube 7. The exterior conical surface 9 is made to fit precisely the tapered bore 2 of the fitting 1. In this connection, attention is called to Figure 5 wherein the sealing member 8 is shown in its compressed position by the full lines and to Figure 4 where the cylindrical inner surface 10 is shown at its minimum diameter.

The sealing member 8 is then expanded by any suitable tool (such as an expanding mandrel) until the diameter of the cylindrical inner surface 10 is sufficiently greater than the outside diameter of the tubing 7 so that the tube may freely enter the sealing member. Attention is again directed to Figure 5 wherein the exterior surface 9 is shown in its expanded position by the dot-dash lines and to Figure 6 wherein the cylindrical inner surface 10 is shown in its expanded position.

It is when the sealing member is in the position shown by the dot-dash lines that it is disposed within the fitting 1. Of course, as the nut 5 is drawn up on the fitting 1, the sealing member 8 will be contracted to its original configuration and naturally this member will conform exactly to the taper of the bore 2 and to the external diameter of the tube 7. Clearly, the sealing member will be closely compressed about the body and after sufficient friction between the sealing member 8 and the conduit 7 has been obtained, the continued movement of the nut will force the end of the tube 7 into close engagement with the bore 2. It is clear, therefore, that I have provided a positive seal between the tube and the fitting and the danger of leakage is prevented positively.

Another particularly important feature is that by virtue of the slight degree of taper of the sealing member 8 and the bore 2, the frictional contact caused thereby will prevent the tubing being blown out of the fitting 1 even though the nut 5 is backed off of the fitting.

In Figure 7 I have shown a slightly modified type of sealing member 8 wherein serrations 15 are provided on the inner surface 10 adjacent to the upper and lower ends. This type of sealing member is employed in connection with tubes or conduits of compressible metals in order to obtain a maximum of frictional contact between the sealing member and the tube.

It is thought apparent from the foregoing description that I have provided a coupling for hydraulic pipe systems wherein a positive seal is effected between the fitting and the pipe per se. In addition, there can be no danger of the pipe being blown out due to the friction between the respective elements. The coupling is very simple in construction and can be readily installed without the necessity of employing skilled workmen.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. In a pipe coupling, a body having a flow bore therein, a conduit receiving end, and a funnel-like tapered bore increasing in diameter from the flow bore toward the conduit receiving end, a conduit extending into said tapered bore, a sealing member positioned in said tapered bore and surrounding the portion of the conduit extending into said tapered bore, said sealing member having an inner surface conforming to the external surface of the conduit and an outer surface conforming to the surface of the tapered bore, said sealing member having a plurality of slots extending axially from each end thereof to a point adjacent, but spaced from the opposite end thereof with the slots from one end alternating with and overlapping the slots extending from the other end thereof to provide a circumferentially expandible and compressible construction, and means cooperating with the body for forcing the sealing member and the conduit frictionally gripped thereby into said tapered bore.

2. In a pipe coupling, a body having a flow bore therein, a conduit receiving end, and a funnel-like tapered bore increasing in diameter from the flow bore toward the conduit receiving end, a conduit extending into said tapered bore, a sealing member positioned in said tapered bore and surrounding the portion of the conduit extending into said tapered bore, said sealing member having an inner surface conforming to the external surface of the conduit and an outer surface conforming to the surface of the tapered bore, said sealing member having a plurality of slots extending axially from each end thereof to a point adjacent, but spaced from the opposite end thereof with the slots from one end alternating with and overlapping the slots extending from the other end thereof to provide a circumferentially expandible and compressible construction, a follower loosely surrounding the conduit, and means cooperating with the body for forcing said follower and the sealing member into said tapered bore.

3. In a pipe coupling, a body having a flow bore therein, a conduit receiving end, and a funnel-like tapered bore increasing in diameter from the flow bore toward the conduit receiving end, a conduit having an exterior diameter greater than the minimum diameter of the tapered bore and extending into said tapered bore with the end of said conduit in contact with the wall of said bore, a sealing member positioned in said tapered bore and surrounding the portion of the conduit extending into said tapered bore, said sealing member having an inner surface conforming to the external surface of the conduit and an outer surface conforming to the surface of the tapered bore, said sealing member having a plurality of slots extending axially from each end thereof to a point adjacent, but spaced from the opposite end thereof with the slots from one end alternating with and overlapping the slots extending from the other end thereof to provide a circumferentially expandible and compressible construction, and means cooperating with the body for forcing the sealing member and the conduit frictionally gripped thereby into said tapered bore, thereby wedging the end of the conduit in said tapered bore.

THOMAS D. DAVIES.